United States Patent Office 3,214,417
Patented Oct. 26, 1965

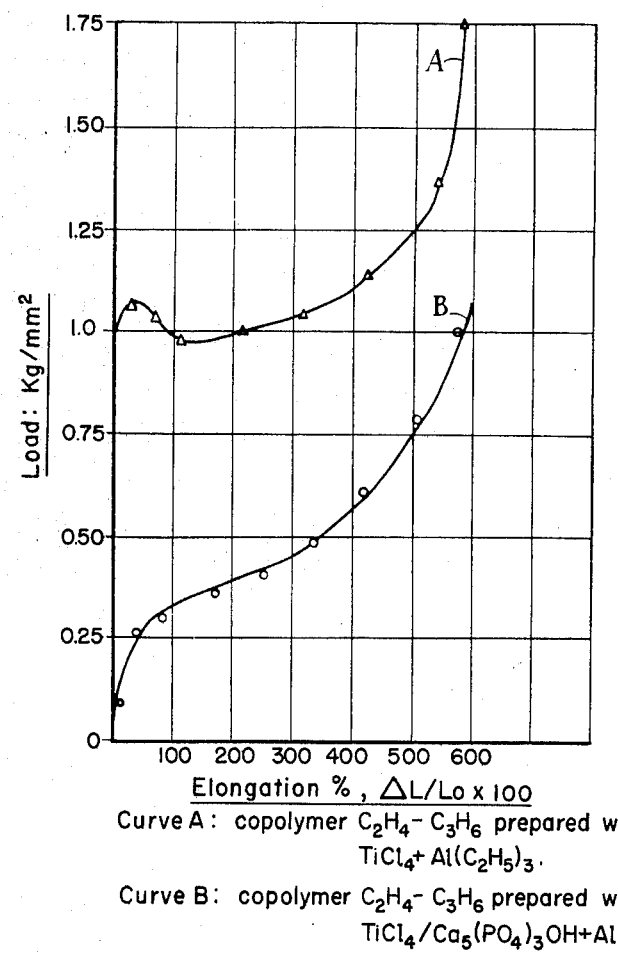
Curve A: copolymer $C_2H_4$-$C_3H_6$ prepared with $TiCl_4 + Al(C_2H_5)_3$.
Curve B: copolymer $C_2H_4$-$C_3H_6$ prepared with $TiCl_4/Ca_5(PO_4)_3OH + Al(C_2H_5)_2Cl$.

3,214,417
PROCESS FOR THE POLYMERIZATION AND CO-POLYMERIZATION OF OLEFINS
Félix Bloyaert, Watermael-Boitsfort, Brussels, and Emile Leblon, Molenbeek-St.-Jean, Brussels, Belgium, assignors to Solvay & Cie., Brussels, Belgium, a Belgian company
Filed Nov. 2, 1961, Ser. No. 149,662
Claims priority, application Netherlands, Nov. 18, 1960, 258,118
10 Claims. (Cl. 260—88.2)

The present invention relates to a process for the polymerization and co-polymerization of olefins in the presence of new catalysts based on a transition metal compound and an organometallic compound.

It is well known to effect the polymerization of olefins in the presence of catalysts prepared by the reaction of a halide, a haloalkoxide or an alkoxide of a metal from the groups IVa, Va or VIa of the Periodic System of Elements, with an organometallic compound of a metal from the groups I, II, III or IV of the same Periodic System.

It is also known to use as catalysts for the polymerization of olefins, metal oxides such as chromium oxide, nickel oxide or molybdenum oxide deposited on porous supports constituted by silica, alumina, thoria or zirconia.

More recently, there has been described the polymerization of ethylene in the presence of solid catalysts prepared by impregnating a calcinated metal oxide such as titanium dioxide with the reaction product of a titanium, vanadium or zirconium halide, and a hydride or an organometallic compound (U.S. patent specification No. 2,909,512).

Finally, it has been proposed to polymerize propylene in contact with catalysts constituted by an organometallic compound from a metal of the groups II or III of the Periodic System, and a silica or alumina support upon which a transition metal compound has been absorbed (Gazetta Chimica Italiana—1957, 87, p. 570).

The present invention relates to a process for the polymerization and co-polymerization of olefins in the presence of a new catalytic system obtained by chemically associating certain elements of known polymerization catalysts with a special support. The new catalytic systems used according to this process make it possible to carry out reactions of polymerization or co-polymerization which are in no way catalyzed by the elements of the system taken separately, or to activate to an appreciably stronger extent polymerization or co-polymerization reactions which are already activated by one or more of the elements constituting the new catalytic system.

The process consists in carrying out the polymerization or co-polymerization of olefins in the presence of a catalyst obtained by the reaction of an organometallic compound and a transition metal compound which is associated with a solid support constituted by an organic phosphate which contains one or more hydroxyl groupings fixed to the molecule and/or water of crystallization.

The catalyst used in the process according to the invention is produced by activating the inorganic phosphate specified above by heating it to a temperature below the dissociation temperature of the hydrates or hydroxy phosphates, preferably to a temperature between 200 and 1000° C., and by subsequently impregnating the activated and cooled support with a transition metal compound. This impregnation must be effected in the absence of moist air, for example by bringing to boiling a suspension of the support in a hydrocarbon such as hexane containing the transition metal compound. The whole operation, including the cooling of the support prior to impregnation, must be carried out in the absence of atmospheric humidity.

At the end of the impregnation it is found that at least one part of the transition metal compound has become chemically fixed to the support. It cannot be eliminated at this instant, even by numerous washings. During impregnation, the evolution of certain volatile decomposition products will be observed, for example hydrogen chloride, if the transition metal compound is a chloride. If the compound is an alkoxide, there will be found the liberation of a more or less substantial quantity of the corresponding alcohol.

In order that the chemical reaction of fixing the transition metal to the support takes place, it is necessary that the inorganic phosphate employed, at the instant of impregnation, contains either water of hydration or at least one hydroxyl group linked with the phosphate molecule.

Although the mechanism of the fixing reaction is not yet clearly defined, it seems highly probable that the reaction takes place through the intermediary of hydroxyl groupings and/or molecules of water of hydration.

The reaction of fixation takes place during impregnation, in general as soon as the support is placed in contact with the transition metal compound, and proceeds during the period of heating to the boiling point.

In the case of hydrated phosphates, there occurs, during activation of the support at rising temperatures, a progressive elimination of the water of hydration. When the transition metal compound is caused to react with the support during impregnation, it is found that the quantity of compound which becomes fixed to the support varies as a function of the temperature at which the support has been activated. An increase in the temperature of activation gives rise to a decrease in the quantity of compound fixed to the support in proportion to the elimination of water of hydration. The fixed quantity becomes practically zero beyond the temperature of dehydration.

The following Table I gives the results of experiments described in Example 1 in which supports of hydrated tricalcium phosphate were activated at various temperatures, then impregnated with titanium tetrachloride. In each case the quantity of titanium expressed in $TiCl_4$ which had become chemically fixed was determined and the catalyst was used in the presence of diethyl aluminium chloride for the polymerization of ethylene.

TABLE I

| Experiment | Temperature of activation, ° C. | Content of Ti chemically fixed during impregnation, g. $TiCl_4$/kg. support | Polymerization of $C_2H_4$. Specific activity of catalyst, g. polymer/h. g. $TiCl_4$·atm.$C_2H^4$ |
|---|---|---|---|
| 1 | 300 | 98.3 | 19.41 |
| 2 | 500 | 60.6 | 19.04 |
| 3 | 800 | 9.56 | 103.50 |
| 4 | 1000 | 1.0 | 4.76 |

It will be seen that after activation at 1000° C., the practically dehydrated support fixes only 1 g. of $TiCl_4$ per kg. of phosphate. Care must be taken not to reach this temperautre of dehydration which causes the activity of the catalyst to drop.

However, it will be seen that when the temperautre of activation is approximately 800° C., the specific activity of the catalyst passes through a maximum which corresponds to more than five times the activity of the same catalyst activated at 500° C.

In the case where phosphates are used as support to the molecule on which there are fixed one or more hydroxyl groups, the activation of the support has less influence on the quantity of transition metal chemically fixed. The hydroxyl groups which most likely contribute to the fixation are much more stable than the molecules of water of hydration, and only when the temperature of decomposition of the phosphate is exceeded the latter no longer reacts. In the case of these supports there should also be noted a maximum of specific activity of the catalyst at an activation temperature in the vicinity of 800° C.

Certain phosphates containing hydroxyl groups also crystallize with a certain number of molecules of water of hydration. In this case, the compound of transition metal is presumably fixed at the same time by the OH groups and the molecules of water of hydration.

Of the inorganic phosphates which can be used as support for catalysts according to the process of the invention, there should be mentioned the class of hydrated metal orthophosphates and that of possibly hydrated metal hydroxyphosphates.

In the first mentioned class of compounds the trimetal orthophosphates of the formula $[M_3(PO_4)_2]_3 \cdot \frac{1}{2}H_2O$ wherein M is a calcium, strontium or barium atom, are especially suitable.

In the second class important results have been obtained with calcium, strontium and barium hydroxyphosphates having the formula $$Ca_4(PO_4)_2(OH)_2, Sr_4(PO_4)_2(OH)_2$$

and $Ba_4(PO_4)_2(OH)_2$ respectively, and with calcium, strontium and barium hydroxyapatites of the formula $Ca_5(PO_4)_3OH$, $Sr_5(PO_4)_3OH$ and $Ba_5(PO_4)_3OH$. Certain compounds such as isolasite of the formula $$Ca_4(PO_4)_2(OH)_2 \cdot 4H_2O$$

which contain hydroxyl groupings as well as water of crystallization are likewise suitable supports for the consituation of catalysts according to the invention.

The transition metal compound with which the support is impregnated is a halide, a halo-alkoxide or an alkoxide of a metal from the groups IVa, Va and VIa of the Periodic System, more particularly a halide, halo-alkoxide or alkoxide of titanium or vanadium, for example $TiCl_4$, $Ti(OC_2H_5)_4$, $Ti(OC_2H_5)_3Cl$, $VOCl_3$ or $VO(OC_4H_9)_3$.

The organometallic compound which is placed in contact with the activated and impregnated support, preferably immediately before the introduction of the monomers, is an organic derivative of a metal from the groups I, II, III or IV of the Periodic System, particularly aluminum derivative such as diethyl aluminum chloride.

The process according to the invention can be applied to the polymerization and co-polymerization of olefins, particularly to the production of polyethylene and of ethylene-proplene co-polymers.

In the case of polymerization of ethylene, the catalysts combined with an inorganic phosphate are substantially more active than when they are used without a support. Certain catalytic systems such as that obtained by the reaction of $Ti(OC_2H_5)_4$ with $Al(C_2H_5)_2Cl$, which do not polymerize ethylene when use by themselves, become good catalysts when chemically associated with an inorganic phosphate.

Also, in the co-polymerization of ethylene with propylene, certain systems which are found to be inactive when used as such become very good catalysts when associated with an inorganic phosphate. This is true, for example, for the systems $Ti(OC_2H_5)_4$—$Al(C_2H_5)_2Cl$ and $$VO(OC_4H_9)_3\text{—}Al(C_2H_5)_2Cl$$

Moreover, the ethylene-propylene co-polymers obtained by the process according to the invention are characterized by an amorphous structure and very good elastomeric properties.

Polymerization and co-polymerization may take place according to known methods; in a gaseous phase that is to say in the absence of any liquid medium dissolving the monomer; in the presence of a dispersing agent in which the monomer is soluble while the polymer is soluble or insoluble in this medium, depending on working conditions. As liquid dispersing agent there is to be understood an inert hydrocarbon which is liquid under polymerization conditions as well as pure monomers kept in the liquid state by their saturation pressure. When the co-polymerization of ethylene and propylene is carried out in a dispersing medium in which the co-polymer is insoluble in contact with an unsupported catalyst, the co-polymer is obtained in the form of a rubber like mass which can be cut up and removed from the autoclave only with great difficulty. In contrast thereto, the co-polymer obtained under the same conditions but in the presence of a catalyst associated with an inorganic phosphate, is obtained in the form of unwelded grains which are easy to handle.

The following examples will convey a better understanding of the idea and the object of the invention without limiting it.

Example 1

Ethylene is polymerized in the presence of a catalyst prepared by reacting $Al(C_2H_5)_2Cl$ on $TiCl_4$ associated with $[Ca_3(PO_4)_2]_3 \cdot \frac{1}{2}H_2O$. A series of four experiments was carried out under the same conditions after activation of the phosphate at different temperatures, namely 300, 500, 800 and 1000° C.

(a) Preparation of the catalyst 11.4 g. of hydrated tricalcium phosphate of the formula $[Ca_3(PO_4)_2]_3 \cdot \frac{1}{2}H_2O$ are activated at one of the temperatures mentioned above for 24 hours. When leaving the oven, the phosphate is introduced into a completely dry flask of 200 cc. and kept in a dry atmosphere. Into the flask are introduced 1.729 g. of $TiCl_4$ in 50 cc. of dry hexane. The suspension is heated, brought to boiling and kept under reflux for 30 minutes. After cooling and decanting, the impregnated support is washed six times with dry hexane. After the last decanting, the residual hexane is evaporated under vacuum by slight heating. Subsequently the quantity of titanium fixed to the support is determined. The contents of titanium, expressed in $TiCl_4$, of the catalysts obtained by activation of the support at four different temperatures are given in Table I.

(b) Polymerization of ethylene

The four catalysts were used for the polymerization of ethylene under identical conditions. 297 mg. of impregnated phosphate which is present as a dry powder are withdrawn. This powder is introduced into an autoclave of stainless steel having a capacity of 3 litres. Subsequently there is poured into this autoclave 1 litre of purified dry hexane and then 240 mg. of $Al(C_2H_5)_2Cl$ in 3 cc. of hexane. The molar ratio $Al(C_2H_5)_2Cl/TiCl_4$ equals 12. The autoclave is then sealed, heated to 60° C. and brought to the effective pressure of 5 kg./cm.$^2$ by the introduction of ethylene. The polymerization mixture is agitated for 3 hours. After completion of the reaction and filtration, the polyethylene is obtained in the form of a white powder. The specific activties of the four catalysts are compared in Table I.

It should be noted that an identical polymerization test carried out in the presence of the catalytic system $$TiCl_4 + Al(C_2H_5)Cl$$

without a support revealed only a very slight specific activity of not more than 2.2 g. of polymer/h. g.

$$TiCl_4 \cdot atm.C_2H_4$$

Example 2

Ethylene is polymerized in the presence of a catalyst prepared by reacting $Al(C_2H_5)_2Cl$ on $Ti(OC_2H_5)_4$ associated with $[Ca_3(PO_4)_2]_3 \cdot \frac{1}{2}H_2O$. A series of three tests was carried out under the same conditions after activation of the phosphate at different temperatures, namely at 300, 500 and 800° C. The preparation of the catalyst and the polymerization are carried out by the methods described in Example 1. The molar ratio $$Al(C_2H_5)_2Cl/Ti(OC_2H_5)_4$$

equals 4.6. The results of these three tests are given in Table II.

TABLE II

| Test | Temperature of activation, °C. | Content of Ti fixed after impregnation, g. Ti(OC₂H₅)₄/kg. phosphate | Specific activity during polymerization of C₂H₄, g. polymer/h. g. Ti(OC₂H₅)₄·atm. C₂H₄ |
|---|---|---|---|
| 1 | 300 | 69.7 | ¹ 3.33 |
| 2 | 500 | 47.2 | ¹ 1.7 |
| 3 | 800 | 8.0 | ¹ 9.81 |

¹ Absence of butene.

It is noteworthy that, under the same conditions, the system Ti(OC₂H₅)₄—Al(C₂H₅)₂Cl used without a support leads only to the dimerization of ethylene.

*Example 3*

Ethylene is co-polymerized with propylene in the presence of a catalyst prepared by causing a mixture of Al(C₂H₅)₂Cl and Al(C₂H₅)Cl₂ to react with Ti(OC₂H₅)₄ associated with calcium hydroxy-apatite of the formula Ca₅(PO₄)₃OH.

(a) *Preparation of the catalyst*

10 g. of calcium hydroxy-apatite are activated at a temperature of 300° C. for 24 hours. When leaving the oven, the hydroxy-apatite is introduced into a dry container. 1.92 g. of Ti(OC₂H₅)₄ in 500 cc. of dry hexane are then poured into the container. The suspension is brought to boiling and heated under reflux for 30 minutes. The contents of the flask are cooled, the suspension decanted and the impregnated support washed 6 times with dry hexane. After drying, the quantity of titanium, expressed in Ti(OC₂H₅)₄, fixed to the hydroxy-apatite is determined. There are found 83 g. per kg. of support.

(b) *Co-polymerization*

1.025 g. of hydroxy-apatite impregnated with

Ti(OC₂H₅)₄ are introduced into an autoclave having a capacity of 1.5 litres. 9 cc. of a solution, in hexane, of 82.29 g. of Al(C₂H₅)₂Cl and 24.19 g. of Al(C₂H₅)Cl₂ per litre are also poured in. The molar ratio of reducing compounds/ Ti(OC₂H₅)₄ equals 3. After sealing the autoclave, 335 g. of pure propylene are condensed therein, the temperature is brought to 17° C. and ethylene is introduced, until the effective pressure of 16 kg./cm.² is reached. Under these conditions of temperature and pressure, the composition of the liquid phase in equilibrium is 80 molar percent of propylene and 20 molar percent of ethylene. The content of the autoclave is stirred for an hour while keeping the pressure constant by the addition of gaseous ethylene, the monomers are then separated and an ethylene-propylene co-polymer is obtained which contains about 35% of propylene and has the form of rubber-like granules which can easily be handled. The specific activity of the catalyst is 1.6 g. copol./h. g. Ti(OC₂H₅)₄.

*Example 4*

Ethylene is co-polymerized with propylene in the presence of a catalyst prepared by causing a mixture of Al(C₂H₅)₂Cl and Al(C₂H₅)Cl₂ to react with VO(OC₄H₉)₃ associated with calcium hydroxy-apatite.

The catalyst is prepared as described in Example 3, after activation at a temperature of 500° C. The quantity of VO(OC₄H₉)₃ fixed to the hydroxy-apatite is 71 g./kg. of support. The ethylene is co-polymerized with the propylene according to a method identical with that described in Example 3. The molar ratio reducing compounds/VO(OC₄H₉)₃ equals 3. After completion of the co-polymerized, there is obtained a co-polymer of amorphous structure in the form of rubber-like granules which are easy to handle. The specific activity of the catalyst is 221 g. copol./h. g. VO(OC₄H₉)₃. The content of solid matter of the suspension at the end of the co-polymerization was 143 g./litre.

*Example 5*

Ethylene is co-polymerized with propylene in the presence of a catalyst prepared by causing Al(C₂H₅)₂Cl to react with TiCl₄ associated with calcium hydroxy-apatite of the formula Ca₅(PO₄)₃OH.

(a) *Preparation of the catalyst*

37.9 g. of calcium hydroxy-apatite are weighed into a completely dry flask and activated at 300° C. for 24 hours. The hydroxy-apatite is then suspended in 75 cc. of pure dry hexane to which 1 cc. of TiCl₄ is added. The suspension is heated under reflux for 30 minutes. After cooling, the impregnated support is washed, then dried under vacuum. The content of titanium expressed in TiCl₄ is 68.4 mg./g. of support.

(b) *Co-polymerization*

Into a dry autoclave swept by a propylene stream there are introduced consecutively 565 mg. of Al(C₂H₅)₂Cl, 591 mg. of supported catalyst, 335 g. of propylene and then ethylene in such a manner that at 40° C. an absolute pressure of 31.8 kg./cm.² is obtained. After a reaction of 4 hours, 223 g. of ethylene-propylene co-polymer are obtained which correspond to an activity of 1379 g. of co-polymer per hour and g. of TiCl₄. The ethylene-propylene co-polymer obtained is amorphous and rubber-life. The results of differential thermal analyses to which this co-polymer was subjected show that it is practically free of crystalline homo-polymers. Moreover, the mechanical characteristics of the homogeneous co-polymers obtained according to the invention are completely different from those of the heterogeneous and partly crystalline co-polymers obtained by co-polymerization of the same monomers in the presence of a catalyst not associated with a phosphate.

In a control test, an ethylene-propylene co-polymer was prepared under similar conditions but in the presence of an unsupported TiCl₄—Al(C₂H₅)₃ catalyst. The properties of the two co-polymers are very different as can be seen from the diagram in the attached FIG. 1.

The curves represent the variation of elongation as a function of the tension. They are obtained according to ASTM method D 412–51 T.

The elongation curve B of the co-polymer prepared according to the process which is the object of the invention is typical of rubber-like materials, whereas the curve A relating to the co-polymer obtained according to the control test shows a structure which is less readily deformed.

*Example 6*

Ethylene is co-polymerized with propylene in the presence of a catalyst prepared by causing Al(C₂H₅)₃ to react with TiCl₄ associated with calcium hydroxy-apatite.

(a) *Preparation of the catalyst*

By proceeding as described in Example 5, a calcium hydroxy-apatite support is impregnated with TiCl₄. The impregnated support has a content of titanium expressed in TiCl₄ of 62.5 mg. TiCl₄/g. of support.

(b) *Co-polymerization*

According to the same method as that described in Example 5, there are introduced into an autoclave 162 mg. of supported catalyst, 1.2 cc. of a solution of Al(C₂H₅)₃ at a concentration of 16.4 mg./cc., propylene and ethylene in such quantities that at 40° C. and under an absolute pressure of 25.4 kg./cm.$^2$, the molar concentration in $C_3H_6$ of the liquid phase is 80%. After a reaction of 4 hours, 342 g. of amorphous co-polymer are obtained which correspond to an activity of 8435 g. of co-polymer per hour and g. of $TiCl_4$.

We claim:

1. A process for the polymerization of olefins wherein said olefins are brought into contact with a catalyst obtained by the steps which comprise activating by heating to a temperature of about 200° C. to 1000° C. a solid support selected from the group consisting of calcium orthophosphate, barium orthophosphate, and strontium orthophosphate, said orthophosphates containing water of crystallization, and calcium hydroxyphosphate, barium hydroxyphosphate and strontium hydroxyphosphate, chemically fixing on the thus-activated solid support a transition metal compound selected from the group which consists of halide, haloalkoxide and alkoxide, said metal being selected from the group which consists of titanium and vanadium, and thereafter reacting an organic derivative of aluminum with said transition metal compound.

2. A process according to claim 1 wherein said support is calcium orthophosphate containing water of crystallization.

3. A process according to claim 1 wherein said support is calcium hydroxyphosphate.

4. Process according to claim 1, wherein the support is activated by heating to a temperature in the vicinity of 800° C.

5. Process according to claim 1, wherein the organic derivative of aluminum is diethyl aluminum chloride.

6. Process according to claim 1 wherein the polymerized olefin is ethylene.

7. Process according to claim 1 wherein the copolymerized monomers are ethylene and propylene.

8. In a process for the polymerization and copolymerization of olefins in the presence of a catalyst based on a transition metal compound selected from the group which consists of halide, halo-alkoxide, and alkoxide of a metal selected from the group which consists of vanadium and titanium, preparing said catalyst by the steps which comprise activating by heating to a temperature of about 200° C. to 1000° C. a solid support selected from the group consisting of calcium orthophosphate, barium orthophosphate, and strontium orthophosphate, said orthophosphates containing water of crystallization, and calcium hydroxyphosphate, barium hydroxyphosphate, and strontium hydroxyphosphate, impregnating the thus-activated solid support with said transition metal compound, whereby transition metal compound is chemically fixed on said solid support, and thereafter reacting an organic derivative of aluminum with said transition metal compound thus-associated with said support.

9. A process according to claim 8 wherein said support is calcium orthophosphate containing water of crystallization.

10. A process according to claim 8 wherein said support is calcium hydroxyphosphate.

References Cited by the Examiner

UNITED STATES PATENTS

| 2,735,823 | 2/56 | Barrett | 252—437 |
| 2,981,725 | 4/61 | Luft et al. | 260—94.9 |
| 3,008,943 | 11/61 | Guyer | 260—94.9 |
| 3,072,633 | 1/63 | Cawthon et al. | 260—94.9 |

FOREIGN PATENTS

| 823,024 | 11/59 | Great Britain. |

OTHER REFERENCES

Catalysis by P. H. Emmett, Reinhold Publishing Corp. (1954), page 260 relied on.

JOSEPH L. SCHOFER, *Primary Examiner.*

MORRIS LIEBMAN, *Examiner.*